Patented Jan. 5, 1954

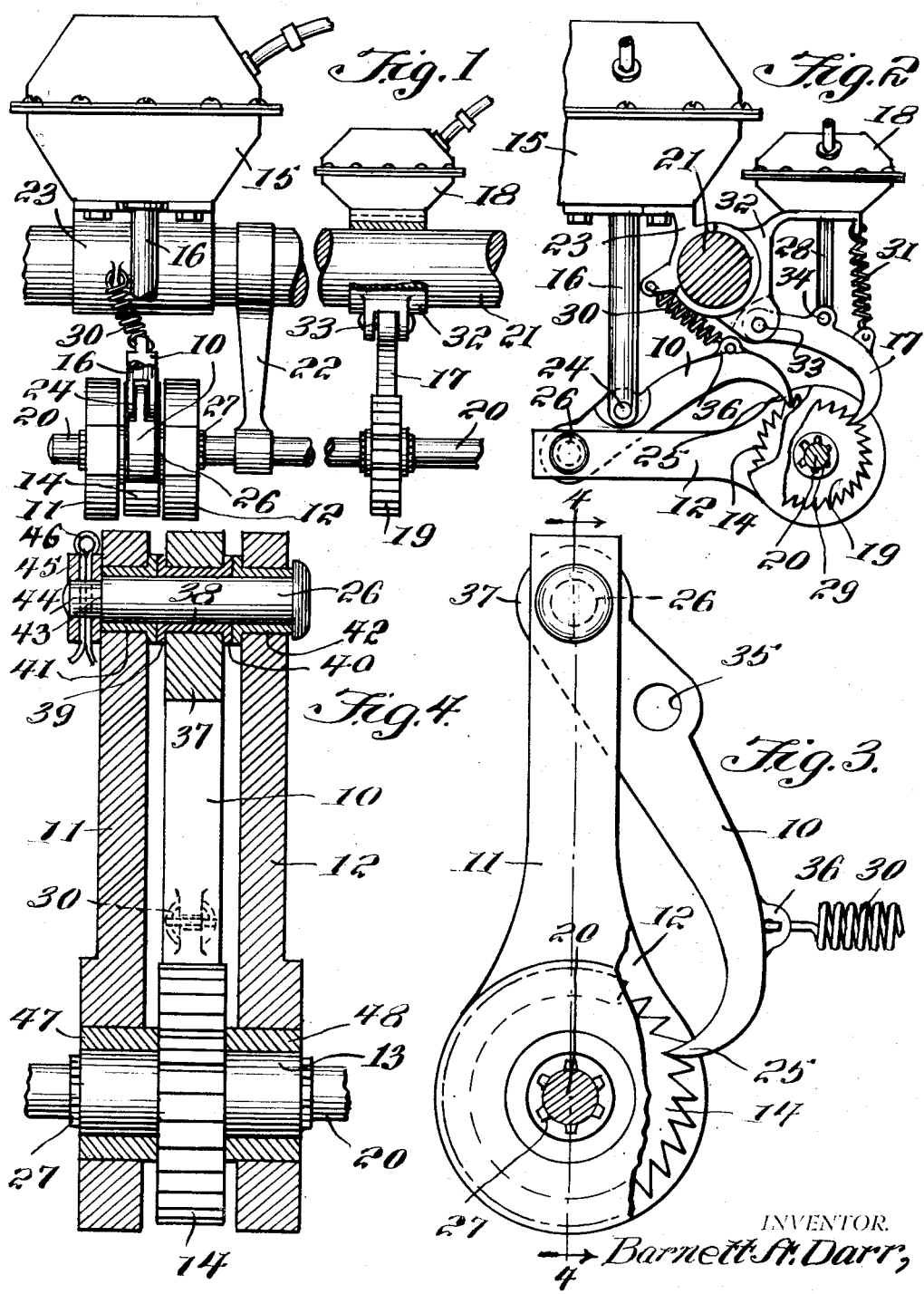

2,664,975

UNITED STATES PATENT OFFICE 2,664,975

AUXILIARY BRAKE CAM ROD LATCH ADJUSTER

Barnett A. Darr, Quincy, Calif.

Application November 8, 1949, Serial No. 126,223

2 Claims. (Cl. 188—196)

This invention relates to auxiliary devices attached to or mounted on motor vehicles for taking up slack brake shoe actuating instrumentalities and in particular a slack adjuster mounted on the axle of a motor vehicle and connected to the brake cam rod whereby as the diaphram of the brake operating cylinder reaches the limit of movement further movement of the cam rod is provided by an auxiliary actuating cylinder and an auxiliary holding cylinder each of which actuates a pawl coacting with a ratchet wheel on the brake cam rod.

The purpose of this invention is to provide an auxiliary attachment for motor vehicles which extends the life of the brake actuated cylinder diaphragm by providing means for taking up slack in the connections between the cylinder and shoes of the brake drums.

In the usual brake actuating instrumentalities play develops in the wearing parts and the diaphragm of the brake actuating cylinder reaches the limit of its travel before the brakes are positively applied. With this thought in mind this invention contemplates auxiliary means for picking up the operation of the brake operating parts after the diaphragm has reached its extreme movement whereby the brakes are positively applied.

The object of this invention is, therefore, to provide an auxiliary attachment for motor vehicle brake systems whereby the movement of the brake cam rod may be continued to positively apply the brakes after the brake actuating cylinder has reached the end of its movement.

Another object of the invention is to provide an auxiliary brake applying device for motor vehicles that may be attached to vehicles now in use.

A further object of the invention is to provide an auxiliary brake applying device for use after the brake actuating cylinder has reached the end of its travel which is of a simple and economical construction.

With these and other objects and advantages in view the invention embodies a pawl carrying frame journaled on the brake cam rod with an auxiliary cylinder for continuing movement of the brake cam rod with the pawl engaging a ratchet on the rod and an additional pawl also actuated by a cylinder for coacting with a ratchet on the brake cam rod for holding the brake cam rod while the former pawl is advanced to take another grip on the ratchet coacting therewith.

Other features and advantages of the invention will appear from the following description taken in connection with the drawings wherein—

Figure 1 is an elevational view with parts broken away and parts shown in section illustrating the brake cam rod of a motor vehicle suspended from the axle by a hanger with the auxiliary cylinders, pawls and ratchet wheels mounted in combination with the rod and axle.

Figure 2 is an end elevational view with the axle shown in section illustrating the relative positions of the cylinder, coacting with pawls and ratchets.

Figure 3 is a detail illustrating the main actuating pawl in combination with the ratchet and the mounting elements thereof.

Figure 4 is a longitudinal section through the pawl and mounting elements shown in Figure 3 taken on line 4—4 of Figure 3 and with the ratchet wheel and outer part of the pawl shown in elevation.

Referring now to the drawings wherein like reference characters denote corresponding parts the auxiliary brake actuating device of this invention includes an actuating pawl 10 carried by floating arms 11 and 12 journaled on extended ends of a hub 13 of a ratchet 14, a diaphram cylinder 15 for actuating the pawl 10 through a connecting rod 16, and a holding pawl 17 actuated by a cylinder 18 and coacting with a ratchet wheel 19 on the brake cam rod 20 on which the ratchet wheel 14 is also positioned.

As illustrated in Figures 1 and 2 the brake cam rod 20 is suspended from an axle 21 by a hanger 22 and the cylinder 15 is mounted on the axle by a bracket 23. With the parts arranged in this manner pressure on the connecting rod 16 which is connected to the pawl 10 by a pin 24 forces the point 25 of the pawl into engagement with the teeth of the ratchet wheel 14 and with the pawl 10 journaled on a pin 26 in the outer ends of the floating arms 11 and 12 the arms will draw the pawl 10 around the brake cam rod 20 in a counterclockwise direction and with the bore of the hub 13 of the ratchet wheel 14 connected to the brake cam rod by splines 27 the brake cam rod will be rotated in a counterclockwise direction.

Should this movement not be sufficient to fully apply the brakes pressure is applied to the cylinder 18 which, through the connecting rod 28 applies pressure to pawl 17 whereby the pawl 17 is forced into engagement with teeth of the ratchet wheel 19 and with the ratchet wheel 19 also splined to the brake cam rod 20 by splines 29, this pawl and ratchet wheel will hold the brake cam rod in advanced position. The pressure may then be released in the cylinder 15 whereby the spring 30 will withdraw the pawl 10 so that the connecting rod 16 may be drawn into the cylinder to rotate the floating arms 11 and 12 in a clockwise direction whereby the pawl 10 takes another bite and is advanced several more teeth. Pressure may then be applied, selectively, with the use of a three-way valve in the hose connections of the cylinders to the cylinder 15 and released in the cylinder 18 whereby the spring 31 withdraws the pawl 17 and the pawl 10 again advances the movement of the brake cam rod in the counterclockwise direction. This cycle of movements may be continued until the brake is positively applied.

Pawl 17 and the cylinder 18 are also mounted on the axle 21 by a bracket 32, the pawl 17 being pivotally mounted in the bracket by a pin 33 and the connecting rod 28 being pivotally connected to the pawl 17 by a pin 34.

The pawl 10 is provided with an eye 35 in which the connecting rod 16 is connected by the pin 24, and an ear 36 to which the spring 30 is connected, as shown in Figure 3. The hub 37 of the pawl 10 is journaled on the pin 26 in a bushing 38, the ends of which are provided with flanges 39 and 40 and the floating arms 11 and 12 are also journaled on the pin 26 by flange bushing 41 and 42, respectively. The pin 26 is provided with a shoulder 43 and a threaded stud 44 with a lock nut 45 thereon extends from the shoulder. The lock nut 45 is secured on the stud by a cotter pin 46. The opposite ends of the floating arms 11 and 12 are journaled on the ends of the hub 13 by bushing 47 and 48, respectively.

This auxiliary brake applying device is mounted to act in conjunction with the usual brake operating cylinder of the motor vehicle and acts upon the brake cam rod when sufficient wear develops in this operating part to prevent the diaphragm of the brake cylinder advancing the brake shoes sufficiently to grip the brake drums with sufficient force to positively lock the brake and as illustrated in the drawing, the combination of the actuating pawl with the holding pawl makes it possible to continue the advancing movement of the brake step by step by turning the brake cam rod with the cylinder 15 and the pawl 10. Extending from each of the cylinders 15 and 18 is a conduit or hose which is adapted to be connected to a suitable source of fluid under pressure. Thus, the pressure within the connectional cylinders 15 and 18 can be varied in order to cause the brake shoes to grip the brake drums when desired. The cam rod 20 functions in the same manner as is conventional with such cam rods, and reference may be made to Patent No. 1,525,568, which shows a shaft 3 that functions in the same manner as the cam rod 20.

It will be understood that only one cylinder may be used and only one pawl with one ratchet wheel operated thereby or as many cylinders and pawls may be used as may be desired.

It will also be understood that other modifications may be made in the design and arrangement of the parts without departing from the spirit of the invention.

What is claimed is:

1. In an auxiliary brake cam rod ratchet adjuster, the combination which comprises a motor vehicle axle, a brake cam rod suspended from the axle, a pair of spaced floating arms journaled on the brake cam rod and extended below the axle, ratchet wheels splined on the said brake cam rod and positioned with one of the said ratchet wheels between the floating arms, a pawl pivotally mounted in the outer end of the floating arms and positioned to engage the ratchet wheel between the arms, a pressure cylinder carried by the axle and having a connecting rod pivotally connected to the said pawl, a spring connected to the pawl at one end and to the axle at the other, a second pawl pivotally mounted on the axle and positioned to engage the ratchet wheel on the brake cam rod positioned outside of the said floating arms, a second pressure cylinder carried by the axle and having a connecting rod pivotally connected to the said second pawl, and a spring connected to the outer end of the said second pawl and second pressure cylinder for urging the said second pawl away from the ratchet wheel when pressure in the second cylinder is released.

2. In an auxiliary brake cam rod ratchet adjuster, the combination which comprises a motor vehicle axle, a brake cam rod suspended from the axle, a pair of spaced floating arms journaled on the brake cam rod and extended below the axle, ratchet wheels splined on the said brake cam rod and positioned with one of the said ratchet wheels between the floating arms, a pawl pivotally mounted in the outer end of the floating arms and positioned to engage the ratchet wheel between the arms, a pressure cylinder carried by the axle and having a connecting rod pivotally connected to the said pawl, a spring connected to the pawl at one end and axle at the other, a second pressure cylinder carried by the axle and having a connecting rod pivotally connected to the said second pawl, and a spring connected to the other end of the said second pawl and second pressure cylinder for urging the said second pawl away from the ratchet wheel when pressure in the second cylinder is released.

BARNETT A. DARR.

References Cited in the file of this patent

UNITED STATES PATENTS

| Number | Name | Date |
|---|---|---|
| 1,525,568 | Chapin | Feb. 10, 1925 |
| 1,929,473 | Bingham | Oct. 10, 1933 |
| 2,167,562 | Browall | July 25, 1939 |
| 2,289,506 | Kuebler | July 14, 1942 |